United States Patent [19]

Bauer et al.

[11] 4,427,225

[45] Jan. 24, 1984

[54] BUMPER FOR MOTOR VEHICLES

[75] Inventors: Wilhelm Bauer; Fritz Häberle; Daniel Riechers, all of Sindelfingen, Fed. Rep. of Germany

[73] Assignee: Daimler-Benz Aktiengesellschaft, Stuttgart, Fed. Rep. of Germany

[21] Appl. No.: 303,526

[22] Filed: Sep. 18, 1981

[30] Foreign Application Priority Data

Sep. 18, 1980 [DE] Fed. Rep. of Germany ....... 3035164

[51] Int. Cl.³ .............................................. B60R 19/06
[52] U.S. Cl. ..................................... 293/132; 293/136
[58] Field of Search .............. 293/120, 131, 132, 135, 293/136, 102

[56] References Cited

U.S. PATENT DOCUMENTS

| | | | |
|---|---|---|---|
| 3,820,835 | 6/1974 | Wilfert | 293/120 |
| 3,989,293 | 11/1976 | Haberle et al. | 293/136 |
| 4,027,909 | 6/1977 | Hauraux et al. | 293/136 |
| 4,079,975 | 3/1978 | Matsuzaki | 293/132 |
| 4,082,338 | 4/1978 | Hutai et al. | 293/136 |
| 4,085,956 | 4/1978 | Weisshappel | 293/136 |

*Primary Examiner*—Robert R. Song
*Attorney, Agent, or Firm*—Craig & Burns

[57] ABSTRACT

A bumper for motor vehicles, with the bumper having an extruded basic element having a shaped retaining rail adapted to accept an impact plate of a shock absorber. The impact plate is floatingly mounted in an elastomeric element. The elastomeric element is pushed into the retaining rail and the retaining rail is provided with recesses adapted to accept associated projections provided on the elastomeric element in a supporting fashion when an installation position of the bumper is reached.

10 Claims, 3 Drawing Figures

BUMPER FOR MOTOR VEHICLES

The present invention relates to a bumper and, more particularly, to a motor vehicle bumper having an extruded basic element which includes a shaped retaining rail adapted to accept an impact plate of a shock absorber floatingly mounted in an elastomer element.

In, for example, German Offenlegungsschrift No. 23 47 075, an elastomeric element is proposed which is surrounded by a housing, with the housing being fastened to a basic element by a fastening means engaging a shape retaining rail.

A disadvantage of the above construction resides in the fact that with that type of fastening a force is introduced which is concentrated on a few fastening points so that stress crack corrosion originating in the fastening points can develop especially after a relatively long operation or use.

A further disadvantage of the above-proposed construction resides in the fact that a replacement of the basic element is extremely difficult because of a lack of good access to the fastening points and, also, the fastening elements have the tendency to become extremely difficult to loosen after a while as a result of corrosion phenomena or dirt.

The aim underlying the present invention essentially resides in providing a bumper for motor vehicles by which a fastening can be effected in such a manner that no corrosion damage may occur.

In accordance with advantageous features of the present invention, a bumper of the aforementioned type is proposed wherein the elastomeric element is pushed onto the retaining rail, with the rail being provided with recesses which accept corresponding projections in the elastomeric element in a supporting fashion when the installation position is reached.

In order to enable a reduction in the overall weight as well as to provide a relatively short sliding path, advantageously, in accordance with the present invention the recesses are interrupted by flanges having a length corresponding to that of the elastomeric element.

In accordance with further features of the present invention, a support which is simple to implement is produced where the projections are located in a transitional range of lateral limiting surface of the elastomeric element facing an open side of the retaining rail and where through projections fitting around the flange on the side having a running on surface.

For additional protection of the installation position, according to the present invention, each elastomeric element may be attached to covering surfaces of the flange which face each other by, for example, an adhesive or cement.

In order to simplify the installation of the bumper as well as to improve the storageability of the module of the bumper which may be premounted by using the floatingly mounted impact plate, in accordance with the present invention, the basic element is provided with a preferably removable opening in order to permit a fastening means to pass through, with the fastening means connecting the impact plate with the bumper.

Accordingly, it is an object of the present invention to provide a bumper for motor vehicles which avoids, by simple means, shortcomings and disadvantages encountered in the prior art.

Another object of the present invention resides in providing a bumper for motor vehicles which enables a simple installation and a rapid removal.

Yet another object of the present invention resides in providing a bumper for motor vehicles which minimizes if not avoids corrosion damage to the fastening elements of the bumper.

A further object of the present invention resides in providing a bumper for motor vehicles which is relatively lightweight and yet is capable of meeting or exceeding the necessary requirements for a motor vehicle bumper.

Another object of the present invention resides in providing a bumper for motor vehicles which is simple in construction and therefore relatively inexpensive to manufacture.

These and other objects, features, and advantages of the present invention will become more apparent from the following description when taken in connection with the accompanying drawings which show, for the purpose of illustration only, one embodiment in accordance with the present invention, and wherein.

Figure 1:
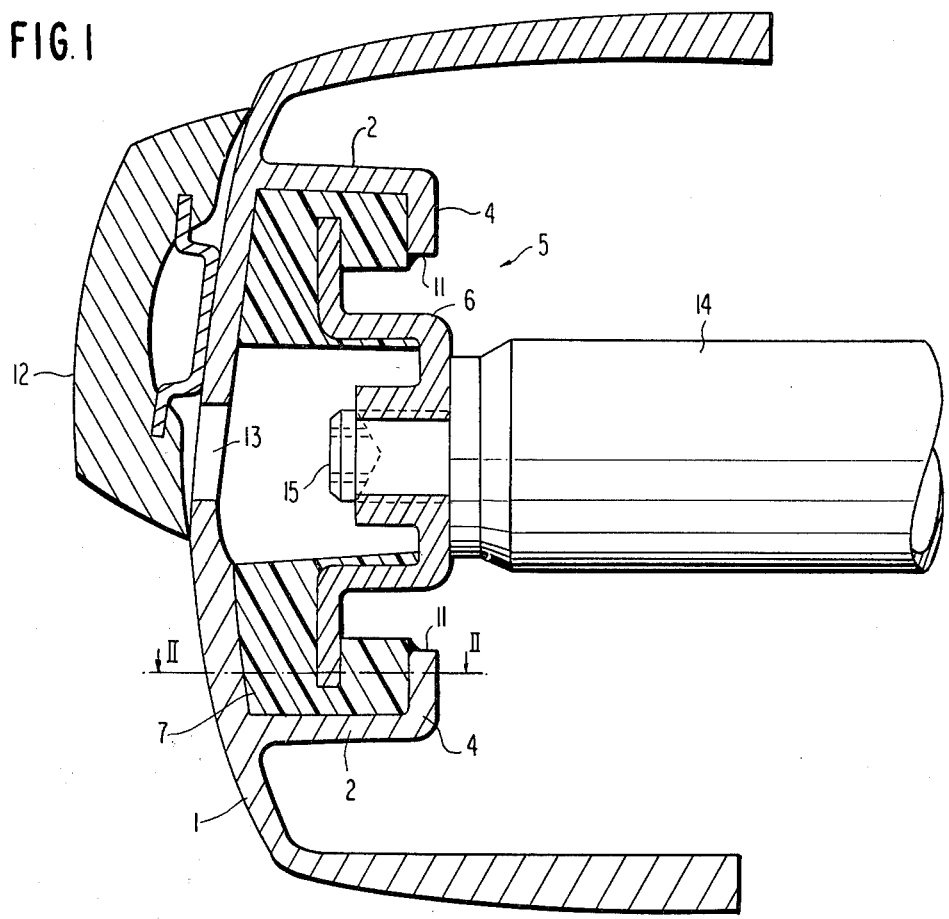
FIG. 1 is a cross sectional view of a bumper constructed in accordance with the present invention.
Figure 3:
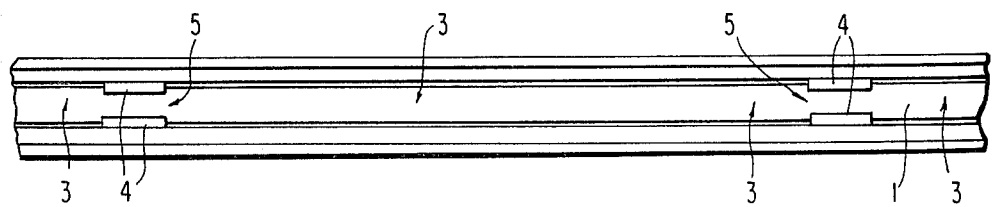
FIG. 3 is a rear view, on a reduced scale, of an interior of the bumper of the present invention, where elastomer elements receiving shock absorbers are not shown.

Referring now to the drawing wherein like reference numerals are used throughout the several views to designate like parts and, more particularly, to FIG. 1, according to this figure, a basic bumper element 1, formed of an extrudable material such as, for example, aluminum, is provided with an internal shaped retaining rail 2. The retaining rail 2, as shown most clearly in FIG. 3, includes a plurality of spaced recesses generally designated by the reference numeral 3 which are adapted to accept, in a supporting fashion, projections 9a, 9b provided on an elastomeric element 7 when the bumper reaches an installation position. The recesses 3 are interrupted by flanges 4 corresponding to a length of the elastomeric element 7. The internal shape retaining rail 2 is constructed in such a manner that the flange 4 forms supporting areas generally designated by the reference numeral 5 for the bumper.

Figure 2:
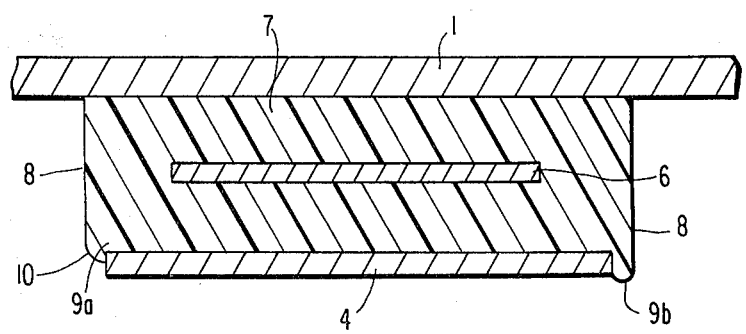
FIG. 2 is a cross sectional view taken along the line II—II in FIG. 1.

The projections 9a, 9b in the transition area of the lateral limiting surfaces 8 of the elastomeric element 7 are aligned toward an open side of the retaining rail 2, and the projections 9a which pass through flange 4 on this side and grip beneath it include a running on surface 10. For premounting or assembling the bumper, an elastomeric element is inserted near each supporting area 5 and pushed under the flange 4 in each of the supporting areas 5. The elastomeric element 7 is adapted to accept an impact plate 6. Upon an insertion of the respective elastomeric elements 7 under the flange, initially the projection 9a, formed in the transistion area of the lateral limiting surface 8 and facing an open side of the retaining rail 2, abuts the flange 4 with its running-on surface 10 and, when the elastomeric element 7 is pushed further, the projection 9a deflects in a spring tensioned manner in order to then become straight again when it reaches the installed position (FIG. 2). In this installed position, the other projection 9b strikes or is brought into abutment with the flange 4 so as to ensure a realiable seating of the elastomeric elements 7 in the respective supporting areas. As shown most clearly in FIG. 2, the projection 9b is more extended than the projection 9a so that the projection 9b abuts and comes to rest against the section of the flange 4.

In order to provide additional protection against undesired displacement, each elastomeric element 7 may be connected to cover surfaces 11 of the flange 4 which face one another by, for example, a suitable adhesive or cement.

The basic element 1 of the bumper is provided with an opening 13 which is adapted to be covered by a superimposable impact strip 12 in each of the support areas 5. The opening 13 acts or functions as an access opening for enabling access to fastening means 15 which serve to fasten a shock absorber 14 which is integral with the body to impact plate 6 thereby considerably simplifying the overall assembly of the bumper.

While we have shown and described only one embodiment in accordance with the present invention, it is understood that the same is not limited thereto but is susceptible of numerous changes and modifications as known to one having ordinary skill in the art and we therefore do not wish to be limited to the details shown and described herein, but intend to cover all such modifications as are encompassed by the scope of the appended claims.

We claim:

1. A bumper for motor vehicles, the bumper comprising a basic bumper element having a retaining rail means provided thereon for accepting a bumper mounting plate, wherein elastomeric means is provided for mounting the bumper mounting plate in the retaining rails means, the elastomeric means is provided with projection means for seating the elastomeric means in the retaining rails means, and means are provided in the retaining rail means for accommodating the projection means in a supporting fashion when the bumper is in an installed position.

2. The bumper according to claim 1, wherein the means for accommodating the projecting means includes recesses formed in the retaining rail means.

3. The bumper according to claim 2, wherein the recesses are interrupted by flange means forming supporting area for the bumper, said flange means having a length corresponding to a length of the elastomeric means.

4. The bumper according to claim 3, wherein the projection means are formed in a transition area of respective lateral limiting surfaces of the elastomeric means and face an open side of the retaining rail means, and in that projection means on one of the limiting surfaces include run-on surface portions to facilitate an insertion of the elastomeric means into the retaining rail means.

5. The bumper according to claim 4, wherein each flange means is provided with covering surfaces facing each other, and means are provided for securing the elastomeric means to the covering surfaces.

6. The bumper according to claim 5, wherein the securing means is an adhesive.

7. The bumper according to one of claims 3, 4, 5, or 6, wherein means are provided for in the supporting areas for the bumper for enabling access to a fastener for the bumper mounting plate, and a cover means is provided on the basic bumper element for covering the access means.

8. The bumper according to claim 7, wherein the access means includes an opening provided in each of the supporting areas.

9. The bumper according to claim 8, wherein the bumper mounting plate is an impact plate of a shock absorber means.

10. The bumper according to claim 9, wherein the basic bumper element is formed of an extrudable material.

* * * * *